(12) United States Patent
Kocenko

(10) Patent No.: US 9,086,265 B2
(45) Date of Patent: Jul. 21, 2015

(54) TAPE MEASURE MULTI-TOOL

(71) Applicant: Robert Paul Kocenko, Ormond Beach, FL (US)

(72) Inventor: Robert Paul Kocenko, Ormond Beach, FL (US)

( * ) Notice: Subject to any disclaimer, the term of this patent is extended or adjusted under 35 U.S.C. 154(b) by 152 days.

(21) Appl. No.: 14/042,410

(22) Filed: Sep. 30, 2013

(65) Prior Publication Data

US 2014/0109417 A1      Apr. 24, 2014

Related U.S. Application Data

(60) Provisional application No. 61/717,439, filed on Oct. 23, 2012.

(51) Int. Cl.
  *G01B 3/10*      (2006.01)

(52) U.S. Cl.
  CPC .............. *G01B 3/10* (2013.01); *G01B 3/1084* (2013.01); *G01B 2003/1089* (2013.01)

(58) Field of Classification Search
  CPC ............. G01B 3/10; G01B 2003/1089; G01B 2003/1084; B43L 9/04; B43L 9/045
  USPC .............. 33/27.02, 27.03, 759, 760, 761, 768
  See application file for complete search history.

(56) References Cited

U.S. PATENT DOCUMENTS

| | | | |
|---|---|---|---|
| 2,349,670 A * | 5/1944 | Moxey | 33/27.03 |
| 3,651,574 A * | 3/1972 | Burkart | 33/760 |
| 6,338,204 B1 * | 1/2002 | Howle | 33/758 |
| 2003/0088993 A1 * | 5/2003 | Baida | 33/668 |
| 2009/0271999 A1 * | 11/2009 | Alker | 33/761 |
| 2012/0240419 A1 * | 9/2012 | Wagner | 33/760 |
| 2014/0165414 A1 * | 6/2014 | Smith | 33/768 |
| 2015/0075022 A1 * | 3/2015 | Bitton et al. | 33/760 |

* cited by examiner

*Primary Examiner* — G. Bradley Bennett

(57) ABSTRACT

A tape measure has multiple functions, including the ability to draw arcs or circles having a specific radius, the ability to draw a straight line a certain distance away from an edge, and the ability to score an item, such as sheet metal. The size of the arcs or circles or the distance from the edge to the straight line is only limited to the length of the tape measure. The tape measure continues to retain its primary function of measuring distances. The tape measure can further include an integrated chalk line. The multiple functions can be provided in a tape measure having the features incorporated at the time of manufacture, or the multiple functions can be added to an existing tape measure.

10 Claims, 4 Drawing Sheets

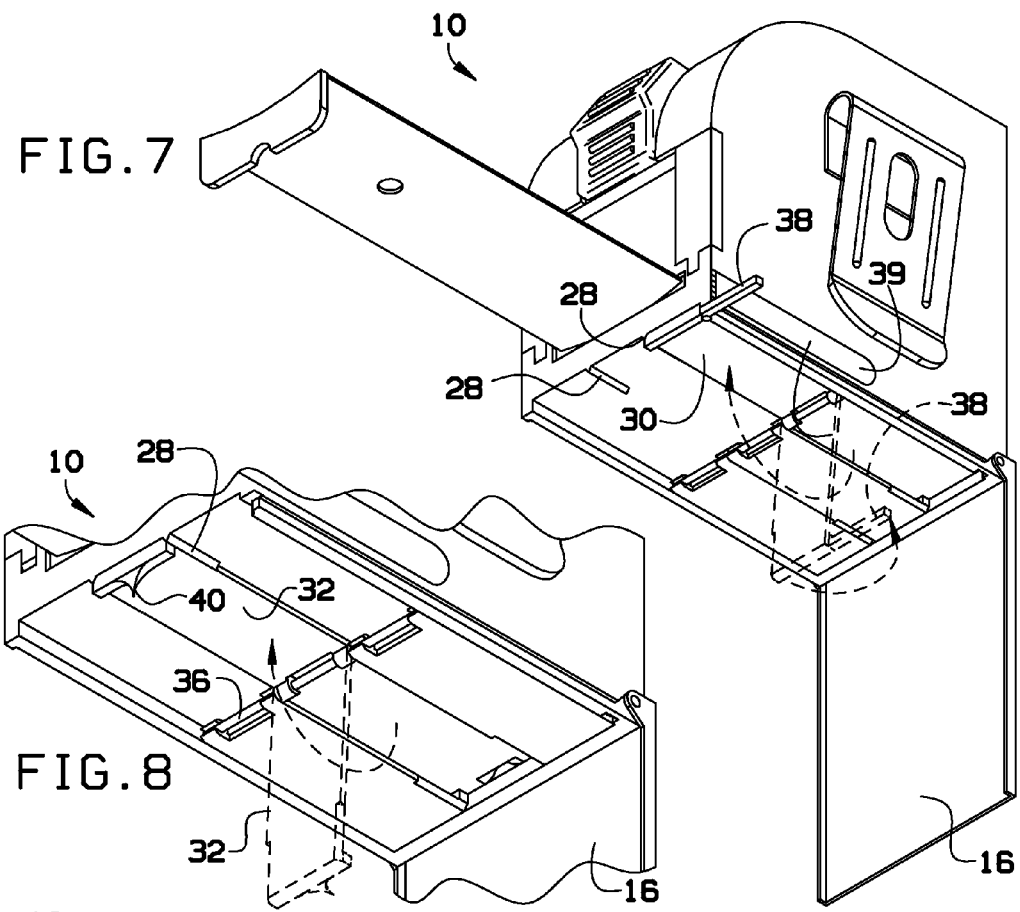

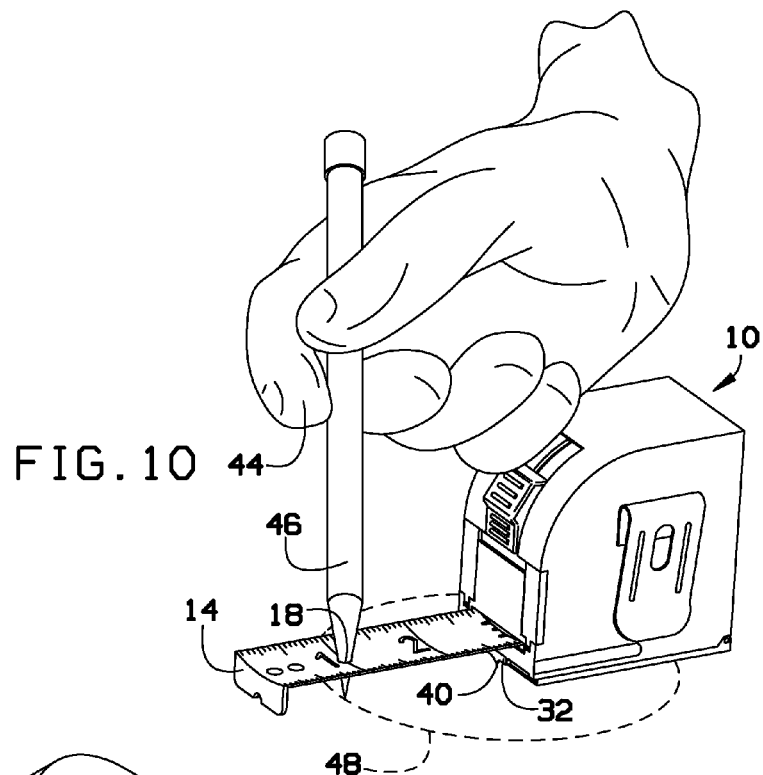
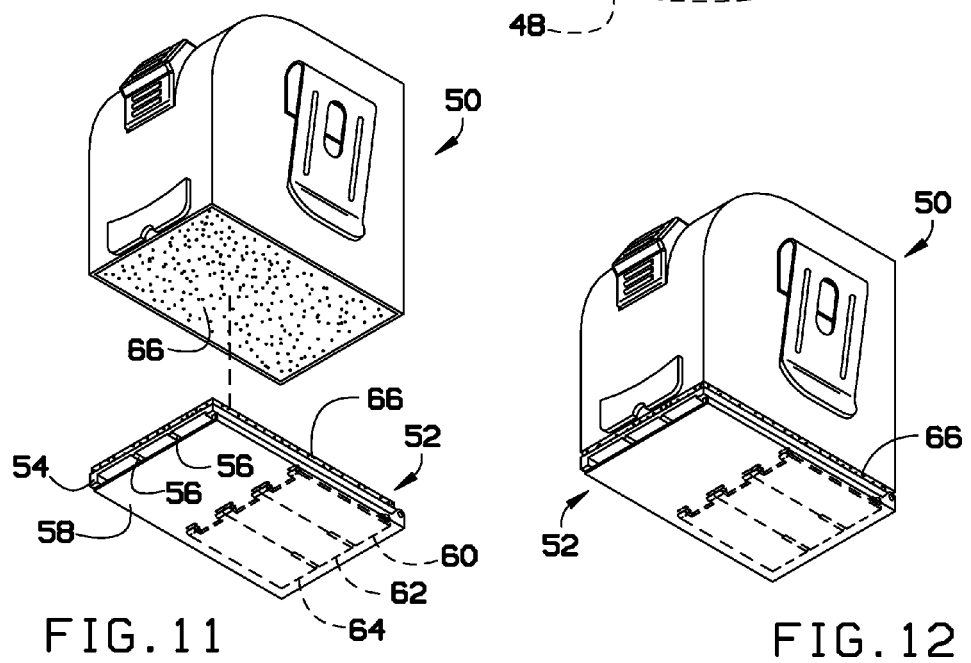
FIG. 10
FIG. 11
FIG. 12

TAPE MEASURE MULTI-TOOL

CROSS-REFERENCE TO RELATED APPLICATION

This application claims the benefit of priority of U.S. provisional application No. 61/717,439, filed Oct. 23, 2012, the contents of which are herein incorporated by reference.

BACKGROUND OF THE INVENTION

The present invention relates to tape measures and, more particularly, to a tape measure multi-tool having multiple functions normally not available on a tape measure.

Skilled tradesmen on or at their job need a certain tool to do a job. They may or may not have the tool, either immediately with them at the job, or may not have the tool at all available. These cases often result in the tradesman using a make shift tool for the job, which can result sometimes in inaccurate work.

Many tradesmen carry tape measures at every job, as this is one of the most fundamental tools for many to use. However, many tape measures are limited to the one function for which there were designed—measuring items. People carry other tools for carrying out other jobs, in addition to their tape measure. This results in many tools that need to be carried from job to job. These tools can be easily lost or misplaced, resulting in lost time and effort on the job site.

As can be seen, there is a need for a tape measure that can perform multiple functions for the user.

SUMMARY OF THE INVENTION

In one aspect of the present invention, a tape measure comprises a stabilization arm movable between a stabilization arm open position and a stabilization arm closed position on a bottom of the tape measure, the stabilization arm providing an edge to move the tape measure therealong; a protractor arm movable between a protractor arm open position and a protractor arm closed position on the bottom of the tape measure, the protractor arm having a protractor arm tip extending away from the tape measure when the protractor arm is in the protractor arm open position; an etch arm movable between an etch arm open position and an etch arm closed position on the bottom of the tape measure, the etch arm having an etch arm tip extending away from the tape measure when the etch arm is in the etch arm open position; and a marking hole disposed in a measuring tape extendable from the tape measure.

In another aspect of the present invention, a tape measure comprises a stabilization arm movable between a stabilization arm open position and a stabilization arm closed position on a bottom of the tape measure, the stabilization arm providing an edge to move the tape measure therealong; a protractor arm movable between a protractor arm open position and a protractor arm closed position on the bottom of the tape measure, the protractor arm having a protractor arm tip extending away from the tape measure when the protractor arm is in the protractor arm open position; an etch arm movable between an etch arm open position and an etch arm closed position on the bottom of the tape measure, the etch arm having an etch arm tip extending away from the tape measure when the etch arm is in the etch arm open position; a hinge axel upon which the stabilization arm, the protractor arm and the etch arm pivots between their respective open positions and their respective closed positions; a cover disposed over the bottom of the tape measure, the cover operable to be opened to provide access to the stabilization arm, the protractor arm and the etch arm; a marking hole disposed in a measuring tape extendable from the tape measure; and a tape stabilization clip movable over a portion of the measuring tape to stabilize the measuring tape.

These and other features, aspects and advantages of the present invention will become better understood with reference to the following drawings, description and claims.

BRIEF DESCRIPTION OF THE DRAWINGS

FIG. 7 is a bottom left side perspective view of the tape measure of FIG. 1, illustrating opening of an alignment tooth and stabilization arm feature;

FIG. 8 is a detailed bottom left side perspective view of the tape measure of FIG. 1, illustrating opening of a protractor arm feature;

FIG. 9 is a detailed bottom left side perspective view of the tape measure of FIG. 1, illustrating opening of an etch arm feature;

FIG. 10 is a perspective view of the tape measure of FIG. 1, in use to draw an arc by using the protractor arm with the protractor arm tip positioned at a center of the arc;

FIG. 11 is a bottom left side perspective view of a standard tape measure, illustrating attachment of a multi-tool attachment thereto; and FIG. 12 is a bottom left side perspective view of the tape measure of FIG. 11, with the multi-tool attachment attached.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a tape measure that has multiple functions, including the ability to draw arcs or circles having a specific radius, the ability to draw a straight line a certain distance away from an edge, and the ability to score an item, such as sheet metal. The size of the arcs or circles or the distance from the edge to the straight line is only limited to the length of the tape measure. The tape measure continues to retain its primary function of measuring distances. The tape measure can further include an integrated chalk line. The multiple functions can be provided in a tape measure having the features incorporated at the time of manufacture, or the multiple functions can be added to an existing tape measure.

Figure 1:
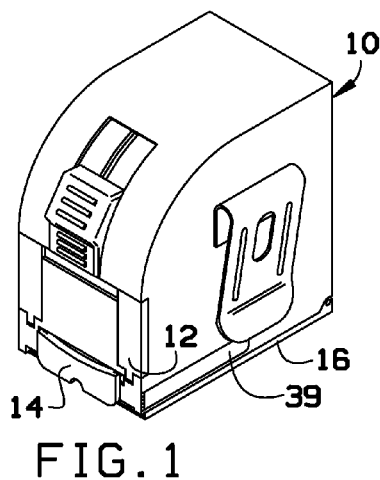
FIG. 1 is an upper left side perspective view of a tape measure, shown in its fully compact state, according to an exemplary embodiment of the present invention.
Figure 2:
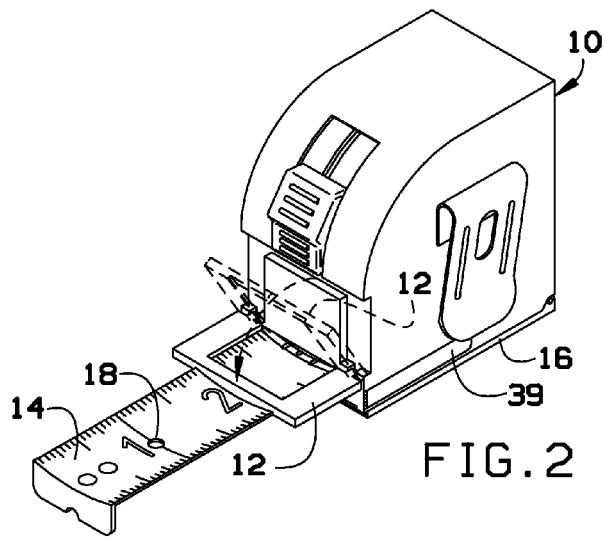
FIG. 2 is an upper left side perspective view of the tape measure of FIG. 1, illustrating a tape stabilization clip in a deployed state.

Referring to FIGS. 1 and 2, a tape measure 10 can include a measuring tape 14 resiliently disposed therein. Similar to conventional tape measures, the measuring tape 14 can be extended out of the tape measure 10 to measure the length of an object, for example. In some embodiments, a tape stabilization clip 12 can be disposed along a front edge of the tape measure 10. The tape stabilization clip 12 can be movable between a stored position (as shown in FIG. 1) and a deployed position (as shown in FIG. 2), where, while in the deployed position, the tape stabilization clip 12 helps keep the measuring tape 14 in its extended state and helps prevent the measuring tape 14 from bending or folding.

A measuring tape marking hole 18 can be disposed in the measuring tape 14, typically near a leading end thereof. The tape marking hole 18 can have a diameter capable of accepting a marking utensil, such as a pencil lead, therein. The marking hole 18 can be located at any location along the measuring tape 14, typically at the one-inch mark as shown in FIG. 2.

A side arm 39 can be disposed on one or both sides of the tape measure 10. The side arm 39 can extend from the body of the tape measure 10 to help provide stabilization.

A cover 16 can be disposed on the bottom of the tape measure 10. As discussed in greater detail below, the cover 16 can be opened to permit the selection of an additional tool for performing one of the multiple functions of the tape measure 10.

Figure 3:
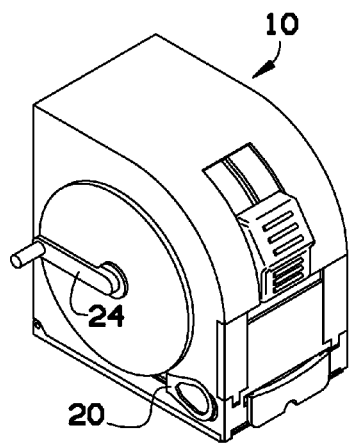
FIG. 3 is an upper right side perspective view of the tape measure of FIG. 1 in a fully compact state.
Figure 4:
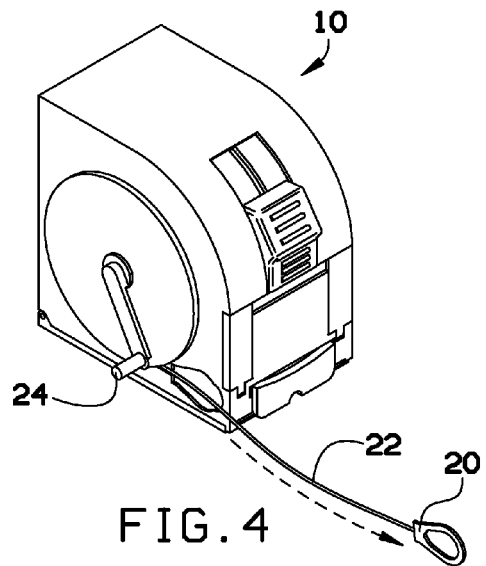
FIG. 4 is an upper right side perspective view of the tape measure of FIG. 1, illustrating extension of a chalk line.
Figure 5:
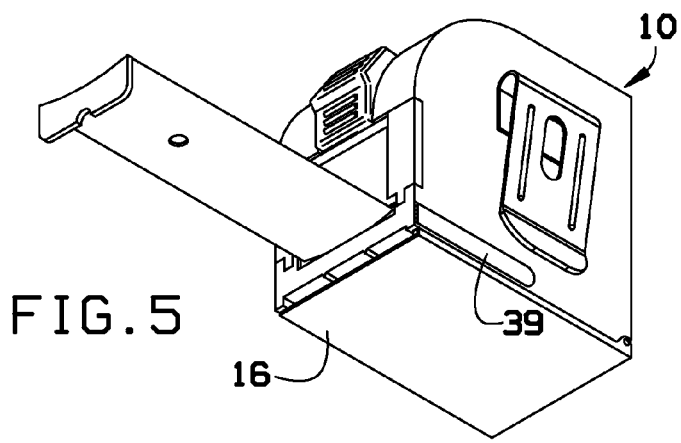
FIG. 5 is a bottom left side perspective view of the tape measure of FIG. 1, illustrated with the tape partially removed.

Referring now to FIGS. 3 and 4, a chalk line 22 can be disposed within the tape measure 10. A reel handle 24 can be disposed on one side of the tape measure 10 to allow a user to reel in the chalk line 22. A chalk line handle 20 can be attached to the end of the chalk line 22 to permit attachment of the chalk line 22 to an item, such as a nail or the like. In some embodiments, the tape measure 10 can include a removable cap (not shown) that can access a cavity in which the chalk line 22 is stored inside the tape measure 10. Chalk can be disposed in the cavity to coat the chalk line 22, as is the usual arrangement of conventional chalk lines.

Figure 6:
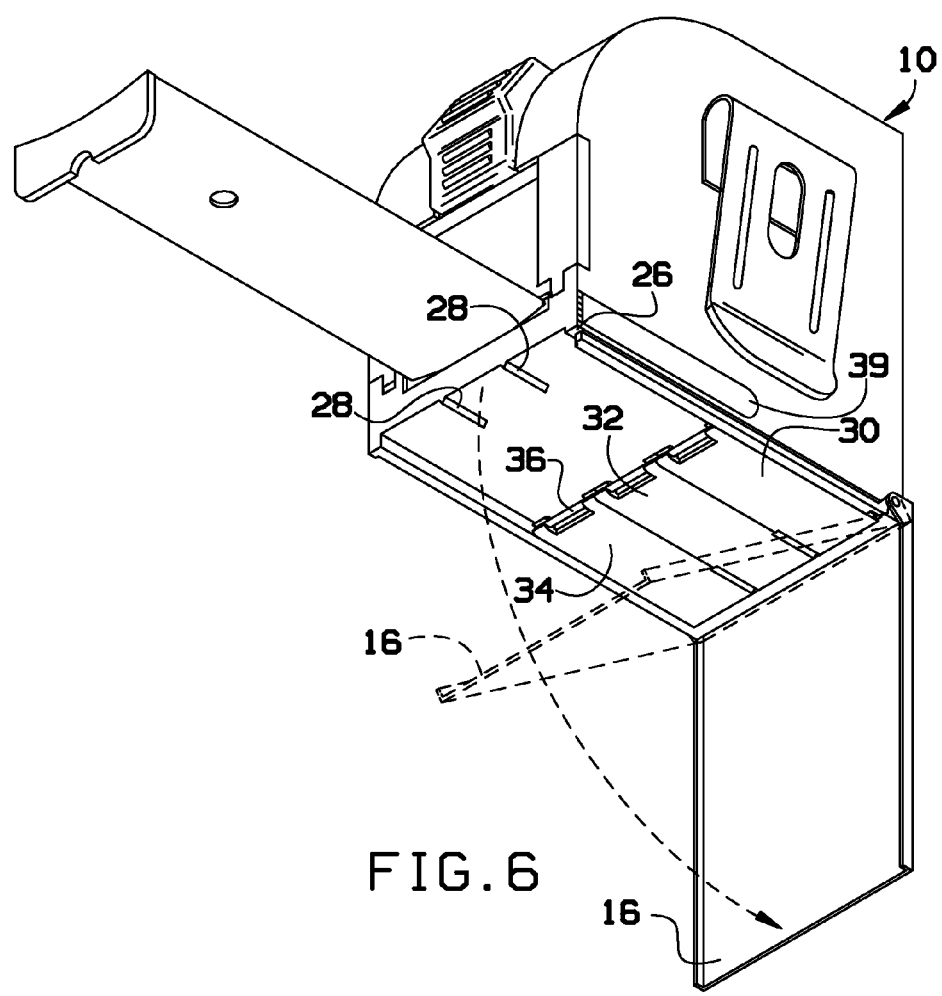
FIG. 6 is a bottom left side perspective view of the tape measure of FIG. 1, illustrating opening of a cover from a bottom portion thereof.

Referring to FIGS. 5 through 9, the bottom cover 16 can hingedly open, as shown in FIG. 6. Inside of the bottom cover 16 can be found several selectable tools. The tools can include a stabilization arm 30, a protractor arm 32 and an etch arm 34. Each of the tools can swing about a hinge axel 36 disposed across a width of the bottom of the tape measure 10. Alignment teeth 28 can be disposed inside the cover 16 to secure the tools (prevent side to side movement, for example) when opened.

As shown in FIG. 7, the stabilization arm 30 can be opened and a stabilization arm sub-arm 38 can extend from the end of the stabilization arm 30 and extend out of a rim notch formed in the base of the tape measure 10. The stabilization arm 30 can be L-shaped where the tape measure 10 can be extended a desired distance and a marking tool 46 can placed in the marking hole 18. The marking tool 46 can tape measure can be slid along an edge, with the stabilization arm 30 disposed against the edge, to cause a straight line to be drawn. With the marking hole 18 disposed at the one-inch point, the stabilization clip 12 can include a marking to accurately indicate the length of the line drawn when the stabilization arm 30 is disposed against an edge from which the measurement is made.

As shown in FIG. 8, the protractor arm 32 can be opened from inside the bottom cover 16. The protractor arm 32 can include a protractor arm tip 40 to allow the tape measure to pivot thereabout. A user 44, as shown in FIG. 10, can set the protractor arm tip 40 at a center of a circle and draw a circle 48 by inserting the writing tool 46 into the marking hole 18 and pivoting the tape measure 10 about the protractor arm tip 40. Similar to the straight line tool, the stabilization clip 12 can include a mark to indicate a measurement (when the measuring tape 14 is extended) for the radius of the circle or arc.

As shown in FIG. 9, the etch arm 34 can be opened. From inside the bottom cover 16. The etch arm 34 can include an etch arm tip 42 that can tip that can be used to etch or mark a surface. For example, the etch arm tip 42 can be made from hardened steel or carbide to allow etching of sheet metal or the like. To etch a straight line, a user can use the end of the measuring tape 14 as an edge and slide the tape measure 10, with the etch arm 34 open, along a surface. To etch an arc or circle, a user can hold the measuring tape 14 in place at the marking hole 18 and move the tape measure 10 along an arc or circle.

While the above describes a tape measure with the multiple tools formed integrally therein, in some embodiments, many of the tools can be added to a conventional tape measure. As shown in FIGS. 11 and 12, an add-on module 52 can be attached to a conventional tape measure 50. The module 52 can include the features described above, with a bottom cover 58 removable to provide access to a stabilization arm 60, a protractor arm 62 and an etching arm 64. The module 52 can attach to the tape measure 50 by various mechanisms. For example a hook and loop fastening system 66, such as Velcro®, can be used to secure the module 52 onto the tape measure 50. In some embodiments, a more permanent solution can be used, such as an adhesive.

It should be understood, of course, that the foregoing relates to exemplary embodiments of the invention and that modifications may be made without departing from the spirit and scope of the invention as set forth in the following claims.

What is claimed is:

1. A tape measure comprising:
   a stabilization arm movable between a stabilization arm open position and a stabilization arm closed position on a bottom of the tape measure, the stabilization arm providing an edge to move the tape measure therealong;
   a protractor arm movable between a protractor arm open position and a protractor arm closed position on the bottom of the tape measure, the protractor arm having a protractor arm tip extending away from the tape measure when the protractor arm is in the protractor arm open position;
   an etch arm movable between an etch arm open position and an etch arm closed position on the bottom of the tape measure, the etch arm having an etch arm tip extending away from the tape measure when the etch arm is in the etch arm open position; and
   a marking hole disposed in a measuring tape extendable from the tape measure.

2. The tape measure of claim 1, further comprising a cover disposed over the bottom of the tape measure, the cover operable to be opened to provide access to the stabilization arm, the protractor arm and the etch arm.

3. The tape measure of claim 1, further comprising a hinge axel upon which the stabilization arm, the protractor arm and the etch arm pivots between their respective open positions and their respective closed positions.

4. The tape measure of claim 1, further comprising a tape stabilization clip movable over a portion of the measuring tape to stabilize the measuring tape.

5. The tape measure of claim 1, further comprising a chalk line extendable from a side of the tape measure.

6. The tape measure of claim 5, further comprising a chalk line handle operable to move the chalk line into the tape measure.

7. The tape measure of claim 1, further comprising a stabilization arm sub-arm extendable from the stabilization arm when in the stabilization arm open position.

8. The tape measure of claim 1, further comprising alignment teeth disposed on the bottom of the tape measure, the alignment teeth disposed along at least a portion of a side of the stabilization arm, the protractor arm or the etch arm when in its respective open position.

9. The tape measure of claim 1, wherein the stabilization arm, the protractor arm, the etch arm and the cover are provided as a module configured to attach to the bottom of a conventional tape measure.

10. A tape measure comprising:
- a stabilization arm movable between a stabilization arm open position and a stabilization arm closed position on a bottom of the tape measure, the stabilization arm providing an edge to move the tape measure therealong;
- a protractor arm movable between a protractor arm open position and a protractor arm closed position on the bottom of the tape measure, the protractor arm having a protractor arm tip extending away from the tape measure when the protractor arm is in the protractor arm open position;
- an etch arm movable between an etch arm open position and an etch arm closed position on the bottom of the tape measure, the etch arm having an etch arm tip extending away from the tape measure when the etch arm is in the etch arm open position;
- a hinge axel upon which the stabilization arm, the protractor arm and the etch arm pivots between their respective open positions and their respective closed positions;
- a cover disposed over the bottom of the tape measure, the cover operable to be opened to provide access to the stabilization arm, the protractor arm and the etch arm;
- a marking hole disposed in a measuring tape extendable from the tape measure; and
- a tape stabilization clip movable over a portion of the measuring tape to stabilize the measuring tape.

* * * * *